(12) United States Patent
Nakano et al.

(10) Patent No.: US 6,879,782 B2
(45) Date of Patent: Apr. 12, 2005

(54) CAMERA HAVING OPERATION MEMBER

(75) Inventors: Toshifumi Nakano, Sagamihara (JP); Naoki Matsumoto, Hachoji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/385,927

(22) Filed: Mar. 11, 2003

(65) Prior Publication Data
US 2003/0185554 A1 Oct. 2, 2003

(30) Foreign Application Priority Data
Mar. 14, 2002 (JP) ........................................ 2002-070531

(51) Int. Cl.[7] .................. G03B 17/02; G03B 17/00; G03B 7/00
(52) U.S. Cl. .................... 396/535; 396/235; 396/542
(58) Field of Search .................. 396/235, 535, 396/540–542, 25, 27, 29; 348/373

(56) References Cited

U.S. PATENT DOCUMENTS

| 4,317,628 A | * | 3/1982 | Shimizu | 396/535 |
| 5,559,573 A | * | 9/1996 | Kamoda et al. | 396/536 |
| 6,322,259 B1 | * | 11/2001 | Miyamoto et al. | 396/448 |
| 6,349,180 B1 | * | 2/2002 | Jabbour et al. | 396/535 |
| 6,381,410 B1 | * | 4/2002 | Noguchi et al. | 396/6 |
| 6,542,701 B2 | * | 4/2003 | Yokoyama et al. | 396/535 |

FOREIGN PATENT DOCUMENTS

| JP | 02-105127 B2 | 4/1990 |
| JP | 2000-267168 A | 9/2000 |
| JP | 2001-290200 A | 10/2001 |

* cited by examiner

Primary Examiner—Judy Nguyen
Assistant Examiner—Rochelle Blackman
(74) Attorney, Agent, or Firm—Frishauf, Holtz, Goodman & Chick, P.C.

(57) ABSTRACT

A camera is provided which includes a camera main body, a first cover covering one side of the camera main body, a second cover covering the other side of the camera main body, an appearance surface formed on an exterior of the camera main body and positioned between the first and second covers when the camera main body is held between the first and second covers to produce an appearance of the camera, and an operation member arranged on the appearance surface.

20 Claims, 4 Drawing Sheets

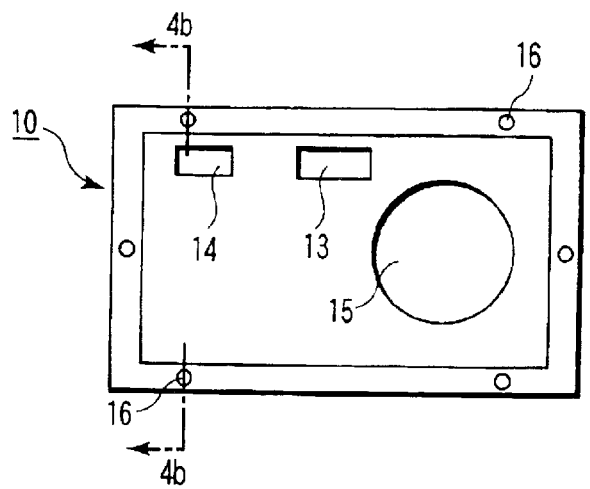
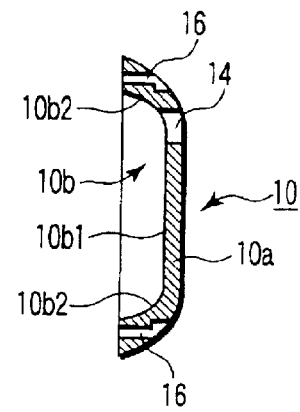
FIG. 4A  FIG. 4B
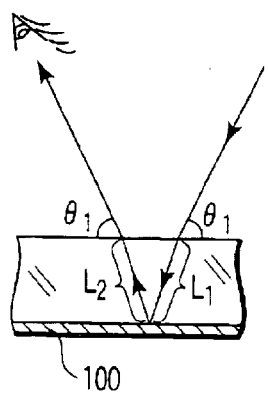
FIG. 5A
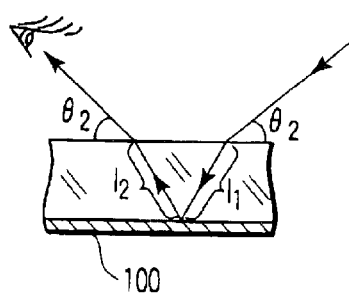
FIG. 5B
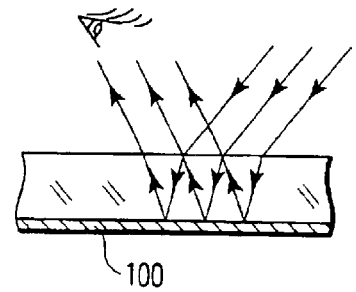
FIG. 5C
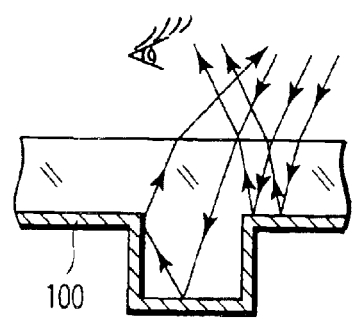
FIG. 5D

CAMERA HAVING OPERATION MEMBER

CROSS-REFERENCE TO RELATED APPLICATION

This application claims the benefit of Japanese Patent Application No. 2002-070531, filed on Mar. 14, 2002, in Japan, the entire contents of which is incorporated herein by reference.

BACKGROUND OF THE INVENTION

1. Field of the Invention

The present invention relates to a camera.

2. Description of the Related Art

In recent years, small, low-cost cameras have become the norm. In addition, it is a significant problem to improve the quality of surface material and to provide an attractive appearance.

Under such circumstances, for example, Japanese Patent No. 2802428 (Jpn. Pat. Appln. KOKAI Publication No. 2-105127) discloses a small-sized camera, which reduces the number of components and has a simplified mechanism. More specifically, the small-sized camera has a winding knob, a shutter mechanism, a rotation blocking member of the winding knob, and a shutter operation member, which are integrally configured. The small-sized camera is provided with an operation member, which is freely rotatable and axially movable with respect to a rotary support shaft of the winding knob. The operation member moves axially, and thereby, the rotation of the winding knob is blocked and blocking is released. On the other hand, the small-sized camera is configured so that the shutter operation can be made by rotation around the shaft of the operation member. The winding knob is provided in a camera main body, and the surroundings of the camera main body are covered with cover members.

Jpn. Pat. Appln. KOKAI Publication No. 2001-290200 discloses the following techniques relating to the structure of operation button, space saving of the structure including it, and improvement in its operability. According to the technique, a push-operatable operation member (cap/button) and a member having a shaft portion projecting from the operation member are integrally formed. The projecting shaft portion is fitted into a recess portion formed in a base plate so that it is freely slidable in the axial direction. A spring is interposed between the operation member and the base plate so that the operation member can be urged in the axial direction. The recess portion is formed with a plurality of projecting portions corresponding to the shaft portion at the axial circumference. A hole or concave portion (clearance) is formed at the position on the operation member corresponding to the projecting portion. The hole or concave portion is used for preventing the operation member from abutting against the projecting portion even if the operation member is being pushed.

The method of attaching various operation members and various techniques relating to the structure of the cover member have been proposed and used in practice.

On the other hand, proposals relating to the feel of surface quality and attractive appearance, that is, external appearance, have been made. For example, Jpn. Pat. Appln. KOKAI Publication No. 2000-267168 discloses a film unit with lens, such that a light blocking effect is kept in the main body even if the front cover is transparently formed, and no "fog" occurs. According to the technique, the lens holder is formed integrally with a light blocking rib, which extends in the direction near to the front end of a field camera, at the circumferential edge. In this case, a sector on the backside of the lens holder and a contact portion of a synchronizing switch are covered with the light blocking rib. Thus, the light blocking rib shields the side of a clearance where the sector is rotatable between the lens holder and the field camera.

BRIEF SUMMARY OF THE INVENTION

According to one aspect of the present invention, there is provided a camera comprising a camera main body, a first cover covering one side of the camera main body; a second cover covering the other side of the camera main body, an appearance surface formed on an exterior of the camera main body and positioned between the first and second covers when the camera main body is held between the first and second covers to produce an appearance of the camera, and an operation member arranged on the appearance surface.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4A is a plan view showing a shape when the front cover member of the camera according to one embodiment of the present invention is viewed from the back, and FIG. 4B is a cross-sectional view showing a shape when the front cover member of the same is viewed from the side;

FIG. 5A to FIG. 5D show an example using a translucent member as one modification example of the cover member of the camera according to one embodiment of the present invention; more specifically, FIG. 5A and FIG. 5B are views to explain a reflecting light path when reflection coating is subjected to the inner surface of the translucent member, FIG. 5C is a view to explain a reflecting light path when the cover member is flat, and FIG. 5D is a view to explain a reflecting light path when a conventional cover member has a convex portion, which looks bad due to scattering.

DETAILED DESCRIPTION OF THE INVENTION

One embodiment of the present invention will be described below with reference to FIGS. 1 to 6.

Figure 1:
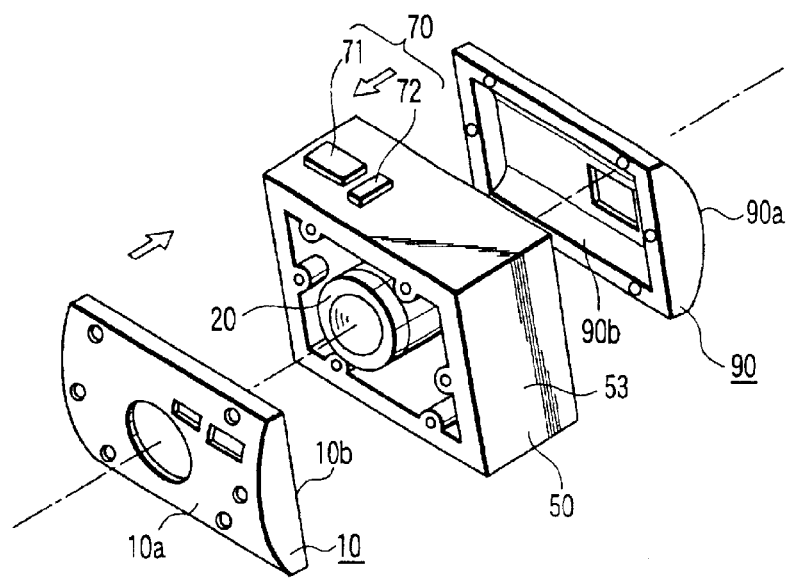
FIG. 1 is a perspective view schematically showing the external appearance and basic structure of a camera according to one embodiment of the present invention.

FIG. 1 shows the structure of a camera according to one embodiment of the present invention.

The basic structure of the camera will be described in detail.

As illustrated in FIG. 1, the camera is configured so that a camera main body 50 is held between front and rear covers 10 and 90. The front cover 10 functions as a first cover covering one side (front side) of the camera. The rear cover 90 functions as a second cover covering the other side (rear or back side) of the camera. The camera main body 50 includes principal parts of the camera.

In a state that the camera main body 50 is held between the front and rear covers 10 and 90, an appearance surface 53, which is interposed between these covers and produces the appearance of the camera, is formed over the entire circumference of the camera. In other words, part of the camera appearance is formed of the appearance surface 53 of the camera main body 50. The appearance surface 53 is visible as part of the camera appearance. At least back surfaces (inner surface 10b, 90b) of independent front and rear covers 10 and 90 are formed as becoming a continuous surface having no concavo-convex portion for ribs. The appearance surface 53 is attached with an operation member 70 including a release button 71 and a zoom button 72 via a predetermined elastic member so that the operation member 70 can be freely pushed. As described above, the appearance surface 53 of the camera main body 50 is provided with various operation members, and thereby, it is possible to easily realize a flat shape of the front 10 and the rear cover 90.

If each of the back surfaces 10b and 90b of the front and rear covers 10 and 90 is flatly and smoothly formed, the cover member may be formed of a material having translucence, as described later. In this case, necessary portions have light blocking effect.

According to the structure, the camera according to one embodiment of the present invention has a flat and simple-shaped cover.

The following is a detailed description of the structure of each member of the camera according to one embodiment of the present invention.

The given camera as the example is a small-sized electronic image pickup camera (digital camera).

Figure 2:
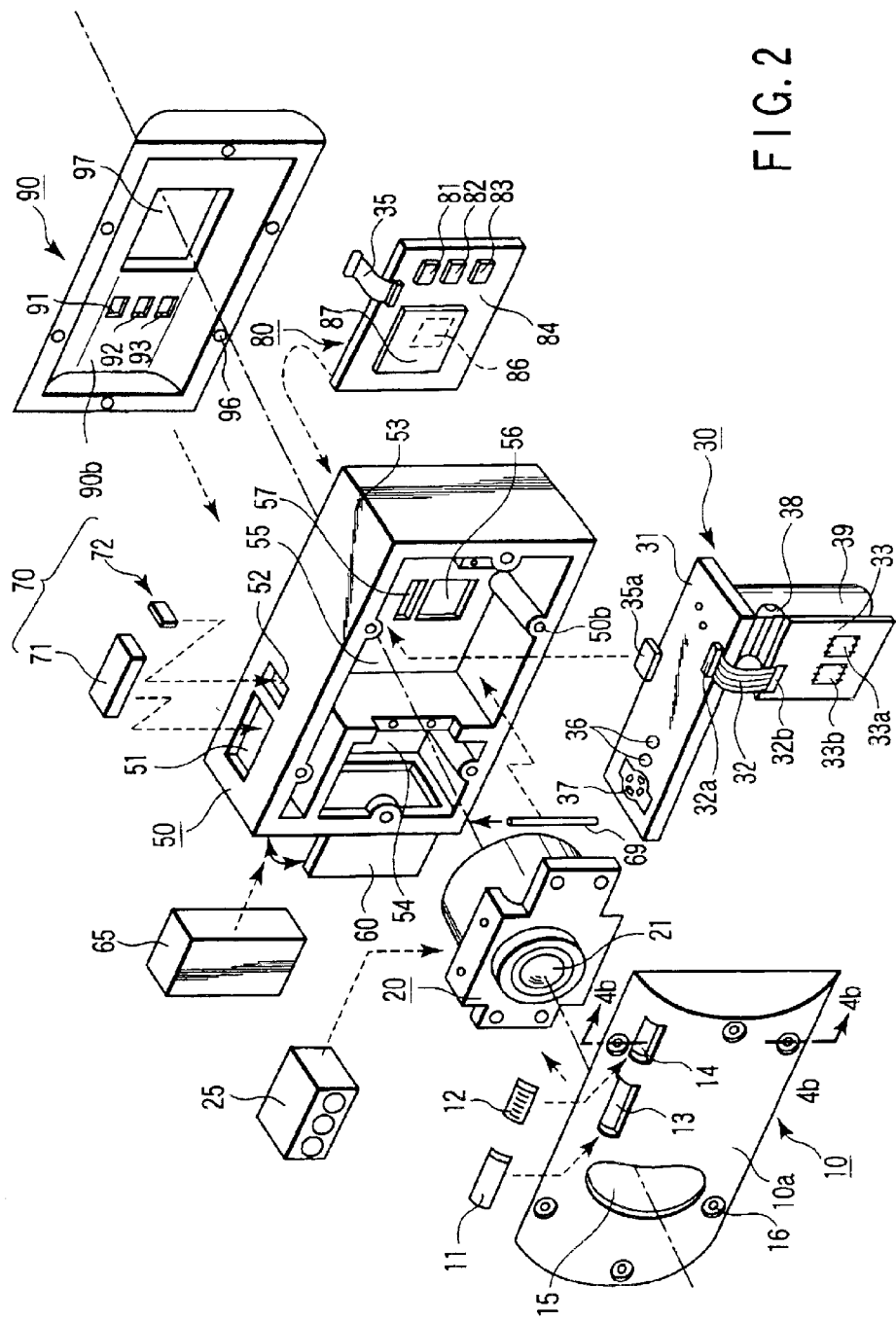
FIG. 2 is an exploded perspective view detailedly showing various members constituting the camera according to one embodiment of the present invention.

The camera is configured by assembling various components, as seen from the exploded perspective view of FIG. 2. That is, the front cover 10 is provided with a finder panel opening 13 into which a finder panel 11 is fitted, a flash (strobe) panel opening 14 into which a flash panel 12 is fitted, and a photographic (taking) lens opening 15. When the front cover is engaged with the camera main body 50 via six screw holes 16 for fixing the front cover, a battery chamber 54 and a main body mount space 55 described later can be secured.

A substrate placement portion 58, on which an electric substrate is placed as one example of a holder, is provided on the upper portion of the battery chamber. An electric substrate 31 is placed on the substrate placement portion 58 as one example of a first electric substrate. The first electric substrate 31 is provided with a switch land as detection means for detecting the operation of the operation members. The substrate placement portion 58 is formed approximately parallel to an operation member attachment portion 50a formed on the appearance surface 53 of the camera main body 50 with a predetermined interval. A substrate housing space 59 is formed between the operation member attachment portion 50a and the substrate placement portion 58.

The back surface of a main body mount space 55 formed partially communicating with the substrate housing space 59 is provided with a wall having a CCD opening 56 and a flexible printed wiring board insertion hole 57.

A lens barrel unit 20 having a photographic lens 21 is held in the main body mount space 55 of the camera main body 50. The lens barrel unit 20 can be projected from and collapsed into the photographic lens opening 15 in the optical axis direction. The lens barrel unit 20 has a zoom function working by the oscillating operation of the zoom button 72.

A finder unit 25 is installed on the lens barrel unit 20 so that an object image can be observed via the finder panel 11.

The camera main body 50 has a built-in substrate group 30, which is mounted with a CPU etc. for controlling the camera. The built-in substrate group 30 is mainly composed of an electric substrate (A substrate) 31. The A substrate 31 is a rigid substrate, and provided with several switch lands (SW contacts) 36 and 37 at the upper surface of the A substrate 31.

A rear surface display unit 80 including a B substrate 84 described later, and a C substrate 33 having an electronic circuit chip for control are given as one example of a second electric substrate. The display unit 80 and the C substrate 33 are connected with the A substrate 31 via a predetermined connector.

More specifically, a flexible printed wiring board 32 for connection as one example of connection conductor is connected to a connector 32a mounted on the A substrate 31 and a connector 32b mounted on the C substrate 33. By doing so, the A substrate 31 and the C substrate 33 are connected. In addition, a flexible printed wiring board 35 for connection as one example of connection conductor is connected to a connector 35a mounted on the A substrate 31 and a connector 35b mounted on the B substrate 84. In this way, the A substrate 31 and the B substrate 84 are connected.

In assembling circuit boards, mutual connection is made in the manner described above, and thereby, a predetermined circuit is configured. The electric substrate (A substrate) 31 is provided with a flash reflector 38 and a flash main capacitor 38 at its lower portion.

The rear surface display unit 80 is attached along the wall backside (rear surface) of the main body mount space 55. In this case, the flexible printed wiring board 35 is connected with the connector 35a through the flexible printed wiring board insertion hole 57 as a through hole.

The rear surface display unit 80 has three rear-surface operation buttons 81 to 83 vertically arranged, the B substrate 84, and the flexible printed wiring board 35 for rear-surface connection. The rear surface display unit 80 is further provided with a CCD 86 corresponding to the CCD opening 56, and a liquid crystal display (LCD) 87 used as the rear surface display panel.

The external wall of the box-shaped camera main body 50, that is, the peripheral surface of the appearance surface 53 is substantially flat. The operation member attachment portion 50a on the upper surface of the appearance surface is provided with a rectangular release button hole 51 and a zoom button hole 52. The operation member attachment portion 50a is attached with a release button 71 and a zoom button 72 via a predetermined elastic member comprising conductive rubber. The release button 71 and the zoom button 72 are vertically movable in the release button hole 51 and the zoom button hole 52, respectively.

The A substrate 31 is abutted against a substrate positioning portion 58a formed in the substrate placement portion 58. In this way, the A substrate 31 is accurately placed at the predetermined position and fixed by a bonding agent or double-faced tape. A step is made on the substrate placement portion 58 to form the substrate positioning portion 58a. According to the positional relationship, the distal end of the conductive rubber vertically moved by the release operation contacts with the switch land 37 on the A substrate 31, and thus, a circuit is made. The same operation as above is made by the zoom operation.

A battery 65 as a rechargeable battery is housed in the battery chamber 54 adjacent to the space housing the barrel unit 20. When a battery chamber cover 60 supported rotatably around a hinge shaft 69 is closed, the battery chamber cover 60 is formed as part of the side appearance member. The rear cover 90 is provided with rear-surface operation button holes 91 to 93 for rear-surface operation buttons 81 to 83, a rear-surface display opening 97 for liquid crystal display (LCD) 87, and six screw holes 96 for fixing the rear cover.

On the other hand, the camera main body 50 is provided with six screw holes 50b for fixing the front and rear covers at each of the front and rear portions. The three components described above are fastened using twelve screws 62a and 62b in a state of being held between the front and rear covers 10 and 90.

Figure 3:
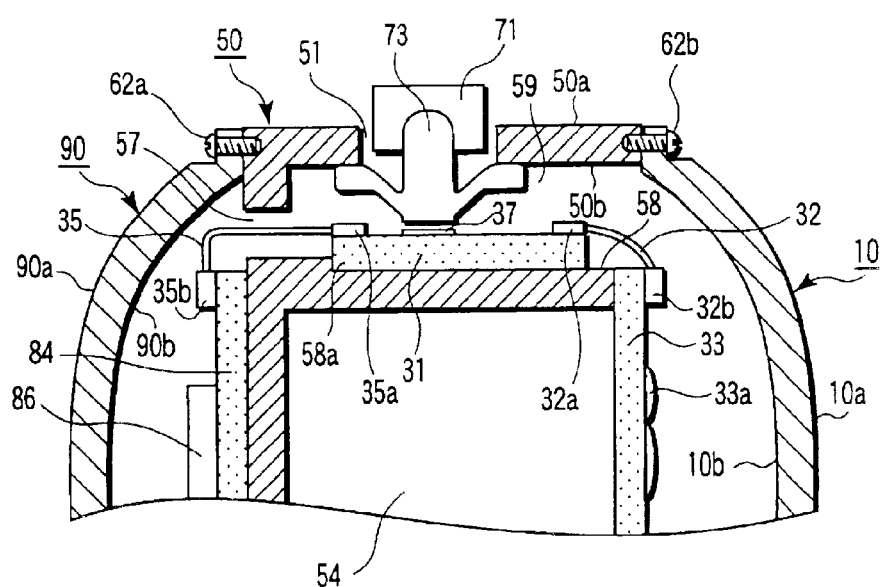
FIG. 3 is a cross-sectional view partially showing the structure of a camera main body held between front and rear cover members of the camera according to one embodiment of the present invention.

The components are assembled, and held between the front and rear covers 10 and 90 as shown in the cross-sectional view of FIG. 3, and thus, an integral structure camera is formed. The cross-sectional view shows a portion vertically cutting the plane including the release button 71.

The release button 71 pushed by the user is attached to an elastic member 73 such as conductive rubber having conductivity to project from the operation member attachment portion 50a of the camera main body. Namely, the release button is attached to the camera main body 50 via the elastic member 73 without ribs. The zoom button 72 is attached in the same manner as above.

In the substrate housing space formed on the upper portion of the battery chamber 54, the A substrate 31 formed with the switch land 37 for detecting the push operation of the release button 71 is placed on the substrate placement portion 58. In this case, the switch land 37 is arranged at the position corresponding to the bottom portion of the elastic member 73. In this state, the substrate placement portion 58 prevents the A substrate 31 from being deformed by pressure force when the operation member such as the release button 71 is operated. Likewise, the substrate placement portion 58 prevents the A substrate 31 from being deformed with respect to the operation of the zoom button 72.

After various built-in components are housed, in a state that the camera main body is held, the front and rear covers 10 and 90 are fastened from front and rear using screws, and thus, an integral structure camera is made.

FIG. 4A and FIG. 4B are a plan view and a cross-sectional view showing a shape of the front cover 10 of the camera, respectively. As described before, the front cover 10 of the camera is provided with the finder panel opening 13, flash panel opening 14 and photographic lens opening 15. In addition, the front cover 10 is provided with six front cover fixing screw holes 16 at the outer peripheral portion. When viewing the cross-sectional shape along a line 4b—4b of FIG. 4A, a smoothly continuous surface having no concave and convex portions is formed at inner and outer sides of the front cover 10, as seen from FIG. 4B. In other words, a surface having no sharply curvature change is formed at inner and outer sides of the front cover 10. In addition, the front cover 10 is not formed with a boss and rib so that no rapid thickness change is made in its cross section.

In order to form the smoothly continuous surface, an arc portion 10b2 (second surface) is formed having curvature tangential to first surface, that is, a plane surface 10b1. The first and second surfaces forming the inner surface of the front and rear covers 10 and 90 are formed without crossing. Namely, the first and second surfaces forming the inner surface are formed tangentially to each other. The barrel unit 20, finder unit 25, various electric substrates, and battery 65 are built into the camera main body 50. The camera main body 50 is held between the front and rear covers 10 and 90 in a state that the operation member 70 such as the release and zoom buttons 71 and 72 are attached thereto. The appearance surface 53 of the camera main body 50 forms part of the camera appearance.

Various operation members are attached to the camera main body 50, and thereby, there is no need to attach members such as operation members to the front and rear covers 10 and 90. Therefore, a flat cover having a simple shape can be formed.

The following is a description of a modification example. According to the modification example, a translucent cover member is used as the cover member of the camera according to the embodiment, and reflection coating is subjected to the inner surface of the translucent cover member.

In FIG. 5A to FIG. 5D, there are shown cross-sectional views to explain the light blocking effect and reflecting light path when the translucent cover member is used as the cover member of the camera.

Here, for comparison, FIG. 5D shows a cross-sectioned view to explain the reflecting light path when reflection coating 100 is subjected to the inner surface of the cover member. In this case, the cover member has a rib and convex portion at the inner surface having bad looks due to scattering.

In the case shown in FIG. 5D, incident light diffusively reflects on the coating surface of the concave-convex portion of the translucent cover member. As a result, only the concave-convex portion of the cover surface is different from the surroundings in its color. Therefore, it can be seen that the appearance has bad looks due to light scattering. Namely, if the cover member has translucence, the concave-convex shape of the inner surface can be seen transparent.

On the contrary, reflection coating is subjected to the inner surface having no concave-convex portion, such as the cover member shown in FIG. 5A to FIG. 5C. In this way, it is possible to prevent light scattering on the translucent cover member forming the camera body; therefore, parallel incident light reflects in a parallel state, and is seen as reflecting light.

If colored material having light translucence is used as the cover member, the color of the camera body is seen differently depending on angle; therefore, a camera having changing color appearance is obtained. That is, as illustrated in FIG. 5A, when the user sees the cover member from an angle of $\theta_1$ to the cover member, a path length permeating through the transparent portion is $L_1+L_2$. On the contrary, as depicted in FIG. 5B, the user sees the cover member from an angle $\theta_2$ smaller than the angle $\theta_1$ to the cover member (from further oblique angle to the cover member). In this case, a path length permeating through the transparent portion is $l_1+l_2$. Thus, the relationship between the path length is $L_1+L_2<l_1+l_2$. Therefore, the optical path through the cover member changes depending on the angle. In other words, the hue of the cover member changes depending on the angle.

According to the modification example having the configuration, the camera has the appearance including plenty of color variation different from a conventional monotone body color. Therefore, it is possible to simply realize a camera having good looks without losing interest. The camera is configured as described in the modification example, and thereby, the quality grade of the appearance is not lost even if a material having translucence is used as the front and rear covers 10 and 90. In addition, the inner surface is formed of a continuously flat surface, and thereby, reflecting light has regularity without diffusively reflecting. Therefore, a body color having a harmonized hue can be obtained. According to the modification example, there is no generation of "color unevenness" occurring in the conventional appearance. In addition, reflection coating 100 is subjected to the continuously flat surface, and thereby, it is possible to provide a camera body having a different color impression depending on the angle.

The reflection coating 100 functions as light blocking means for preventing external light from intruding into the camera. In this case, preferably, the external surface of the cover member is not formed with stepped portions, and thereby, the thickness of the cover member has no large change. For example, if the external surface is formed as an offset surface of the inner surface, the cover member has uniform thickness. Therefore, color change by varying the user's sight direction can be uniformly made over the entire cover member. In addition, the external surface of the cover member may be formed so that each surface does not cross. Namely, each surface forming the external surface of the cover member is formed to be tangential to each other, and thereby, stepped portions can be removed without forming the appearance shape into flat surface.

The following modification may be made in the embodiment.

Figure 6:
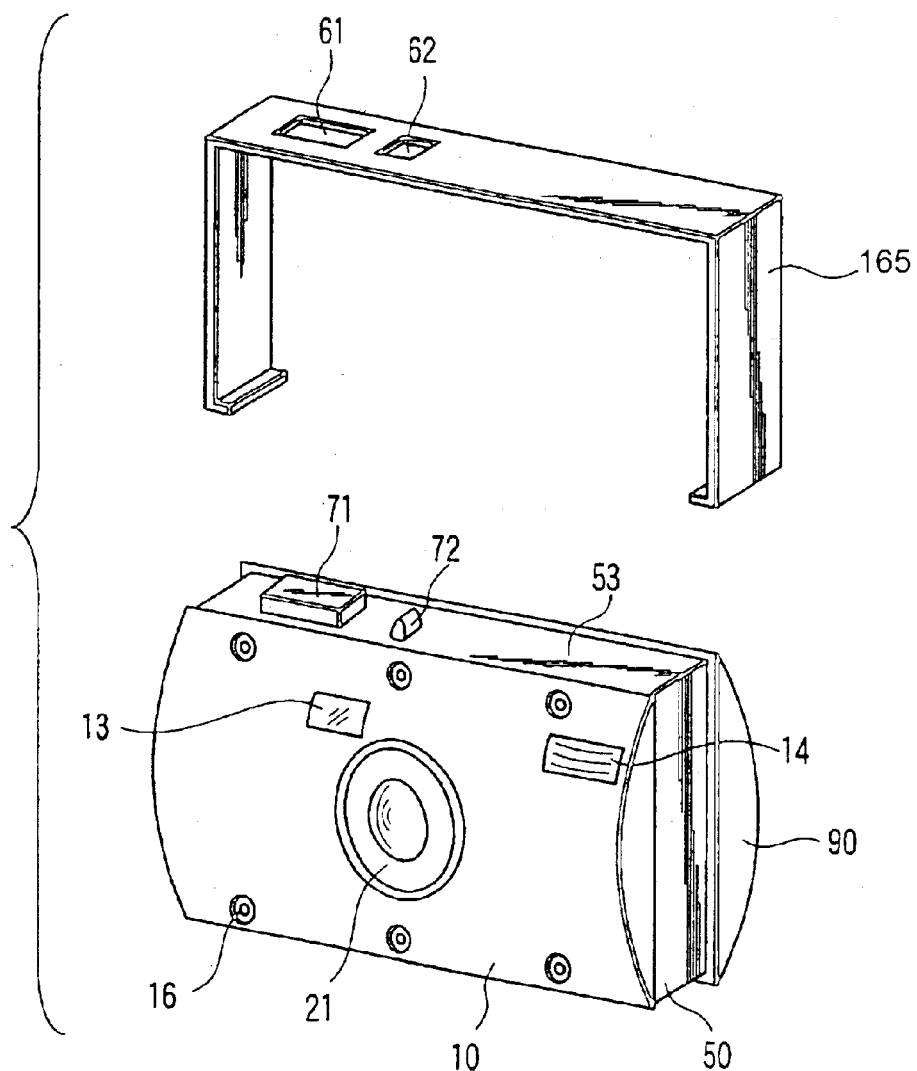
FIG. 6 shows one modification example of the cover member of the camera according to one embodiment of the present invention, and is a perspective view showing a state of assembling the camera main body and an external appearance panel covering it.

FIG. 6 is a perspective view to explain a camera according to the modification example of the embodiment described above. The camera according to the modification example has the following structural features. That is, an appearance panel 165 for covering the camera main body 50 from three directions is further assembled to the camera main body 50 between the front and rear cover members 10 and 90 from above.

The U-shaped appearance panel 165 used as the cover member is provided with a release button hold 61 and a zoom button hole 62, which are adjacent to each other, at the upper portion.

The inner surface of the appearance panel 165 is flat, and formed by simply bending a plate-shaped member into a U-shape. Both end portions of the appearance panel 165 having a predetermined elastic force are formed with inwardly and slightly folded portions. When the appearance panel 165 is assembled to the camera main body 50, both end portions are fitted into the bottom angular portion of the camera main body 50. The thickness of the appearance panel 165 covers the step difference between the cover members 10, 90 and the camera main body 50. Therefore, a substantially continuous and smooth appearance is exposed without a step difference in the circumferential direction of the camera.

According to the modification example of the embodiment, it is possible to provide a camera including cover member having a flat circumferential surface and simple shape.

The present invention is not limited to the embodiment described before, and of course, application and combination of the embodiment is included in the scope of the present invention.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A camera comprising:

a camera main body;

a first cover which covers a first side of the camera main body, and which is fixed to the camera main body, wherein a reflection surface is formed on approximately an entire surface of the camera main body side of the first cover, and wherein the first cover comprises translucent material;

a second cover which covers a second side of the camera main body, and which is fixed to the camera main body, wherein a reflection surface is formed on approximately an entire surface of the camera main body side of the second cover, and wherein the second cover comprises translucent material;

an appearance surface which: (i) is formed on an exterior of the camera main body, (ii) is positioned between the first and second covers when the camera main body is held between the first and second covers, and (iii) produces an appearance of the camera;

an operation member arranged on the appearance surface;

a battery housing chamber for storing a battery; and a battery cover which is supported on the camera main body, and which opens arid closes an opening of the battery housing chamber.

2. The camera according to claim 1, wherein the appearance surface is formed around substantially an entire circumference of the camera between the first and second covers.

3. The camera according to claim 2, wherein the operation member is arranged on an upper surface of the camera.

4. A camera comprising:

a lens barrel unit;

a camera main body holding at least the lens barrel unit;

a front cover which covers a front side of the camera main body, and which is fixed the camera main body, wherein a reflection surface is formed on approximately an entire surface of the camera main body side of the front cover, and wherein the front cover comprises translucent material;

a rear cover which covers rear side of the camera main body, and which is fixed to the camera main body, wherein a reflection surface is formed on approximately an entire surface of the camera main body side of the rear cover, and wherein the rear cover comprises translucent material;

an appearance shape surface which (i) is formed on an exterior of the camera main body, (ii) is interposed between the front and rear covers when the camera main body is held between the front and rear covers, and (iii) defines an appearance shape of a side portion of the camera;

an operation member arranged on the appearance shape surface; and a first electric substrate having a switch for detecting an operation of the operation member, said first electric substrate being arranged at a position which is a predetermined distance from a backside of the appearance shape surface provided with the operation member.

5. The camera according to claim 4, further comprising:
a holder portion formed in the camera main body and arranged in parallel with the appearance shape surface, where in the first electric substrate is fixed on the holder portion.

6. The camera according to claim 5, further comprising:
a second electric substrate arranged at one of the front side and the rear side of the camera main body;
a connection conductor electrically connecting the first electric substrate and the second electric substrate; and
a through hole arranged near to the holder portion, and capable of permitting the connection conductor to be inserted therein.

7. The camera according to claim 6, wherein the connection conductor comprises one of a lead wire and a flexible printed wiring board.

8. The camera according to claim 4, wherein the appearance shape surface is formed around substantially an entire circumference of the camera between the front and rear covers.

9. The camera according to claim 8, further comprising:
an appearance panel fixed to the appearance shape surface to produce an appearance of the camera.

10. The camera according to claim 4, further comprising:
an appearance panel fixed to the appearance shape surface to produce an appearance of the camera.

11. The camera according to claim 4, further comprising:
a battery housing chamber provided in the camera main body; and
a battery cover supported on the camera main body, and capable of opening and closing an opening of the battery housing chamber.

12. The camera according to claim 11, further comprising:
a shaft member held to the camera main body for rotatably supporting the battery cover.

13. A camera comprising:
a camera main body;
a first cover which covers a first side of the camera main body, and which is fixed to the camera main body, wherein a reflection surface is formed on approximately an entire surface of the camera main body side of the first cover, and wherein the first cover comprises translucent material;
a second cover which covers a second side of the camera main body, and which is fixed to the camera main body, wherein a reflection surface is formed on approximately an entire surface of the camera main body side of the second cover, and wherein the second cover comprises translucent material;
an appearance shape surface which (i) is formed on an exterior of the camera main body, (ii) is interposed between the first and second covers when the camera main body is held between the first and second covers, and (iii) defines an appearance shape of the camera; and
an operation member arranged on the appearance shape surface,
wherein a backside of each of the first and second covers comprises a smooth and flat surface.

14. A camera comprising:
a camera main body;
first cover which covers a first side of the camera main body, and which is fixed to the camera main body, wherein a reflection surface is formed on approximately an entire surface of the camera main body side of the first cover, and wherein the first cover comprises translucent material;
a second cover which covers a second side of the camera main body, and which is fixed to the camera main body, wherein a reflection surface is formed on approximately an entire surface of the camera main body side of the second cover, and wherein the second cover comprises translucent material;
an appearance shape surface which (i) is formed on an exterior of the camera main body, (ii) is interposed between the first and second covers when the camera main body is held between the first and second covers, and (iii) defines an appearance shape of the camera;
an operation member arranged on the appearance shape surface; and
a first electric substrate having a switch for detecting an operation of the operation member, said first electric substrate being arranged at a position which is a predetermined distance from a backside of the appearance shape surface provided with the operation member,
wherein a backside of each of the first and second covers comprises a smooth and flat surface.

15. The camera according to claim 14, further comprising:
a holder portion formed in the camera main body and arranged in parallel with the appearance shape surface,
wherein the first electric substrate is fixed on the holder portion.

16. The camera according to claim 15, further comprising:
a second electric substrate arranged at one of a front side and a rear side of the camera main body;
a connection conductor electrically connecting the first electric substrate and the second electric substrate; and
a through hole arranged near to the holder portion, and capable of permitting the connection conductor to be inserted therein.

17. The camera according to claim 13, wherein the appearance shape surface is formed around substantially an entire circumference of the camera between the first and second covers.

18. A camera comprising:
a camera main body;
a first cover which covers a first side of the camera main body, and which is fixed to the camera main body, wherein a reflection surface is formed on approximately an entire surface of the camera main body side of the first cover, and wherein the first cover comprises translucent material;
a second cover which covers a second side of the camera main body, and which is fixed to the camera main body, wherein a reflection surface is formed on approximately an entire surface of the camera main body side of the second cover, and wherein the second cover comprises translucent material;
a portion that is arranged on the camera main body, and that is exposed from the first arid second covers when the camera main body is held between the front and rear covers;

an operation member arranged on the exposed portion;

a first electric substrate that is arranged at a position opposite to the operation member and that is fixed on the camera main body; and a switch to detect an operation of the operation member arranged on the first electric substrate.

19. The camera according to claim 18, further comprising:

a holder portion that is provided on the camera main body at a position remote from a backside of the exposed portion by a predetermined distance;

wherein the first electric substrate is fixed on the holder portion.

20. The camera according to claim 19, further comprising:

a second electric substrate arranged on one of a front side and a rear side of the camera main body;

a conductor electrically connecting the first electric substrate and the second electric substrate; and a through portion which is arranged close to the holder portion and which is capable of permitting the conductor to be inserted therein.

* * * * *